United States Patent [19]
Greiner et al.

[11] Patent Number: 6,089,859
[45] Date of Patent: Jul. 18, 2000

[54] REDUCED CARBON FROM UNDER OXIDIZED BURNER

[75] Inventors: Leonard Greiner; Richard Woods, both of Long Beach, Calif.

[73] Assignee: Hydrogen Burner Technology, Inc., Long Beach, Calif.

[21] Appl. No.: 09/240,298

[22] Filed: Jan. 29, 1999

Related U.S. Application Data

[60] Provisional application No. 60/089,942, Jun. 19, 1998.

[51] Int. Cl.$^7$ ....................................... F23D 11/44
[52] U.S. Cl. .......................... 431/242; 431/210; 431/215; 48/102 A; 48/107
[58] Field of Search ............................... 431/11, 12, 242, 431/243, 247, 248, 350, 354, 210, 215; 48/61, 102 A, 107, 108, 113, 116, 117

[56] References Cited

U.S. PATENT DOCUMENTS

| | | |
|---|---|---|
| 5,002,481 | 3/1991 | Forster ..................................... 431/208 |
| 5,207,185 | 5/1993 | Greiner . |
| 5,299,536 | 4/1994 | Moard . |
| 5,437,123 | 8/1995 | Greiner . |
| 5,441,546 | 8/1995 | Moard . |
| 5,529,484 | 6/1996 | Moard . |
| 5,546,701 | 8/1996 | Greiner . |

*Primary Examiner*—James C. Yeung
*Attorney, Agent, or Firm*—Colin P. Abrahams

[57] ABSTRACT

A burner apparatus for reducing carbon production, comprises a burner having a combustion chamber and a heat exchanger located within the combustion chamber. The heat exchanger has an inlet end where a mixture comprising air and fuel enters, a heat transfer section, and an outlet end from which a process mixture of air and fuel discharges into the combustion chamber and is ignited to produce a product mixture. The inlet end and outlet end are located such that the general flow direction of the air and fuel within at least a portion of the heat transfer section is substantially parallel with flow direction of the product mixture in the combustion chamber. The heat transfer section is located within the combustion chamber so as to receive thermal input from the combusted product mixture therein to heat the process mixture to a temperature sufficiently high to substantially reduce the production of solid carbon therein. The invention is also for a method for reducing carbon production.

40 Claims, 10 Drawing Sheets

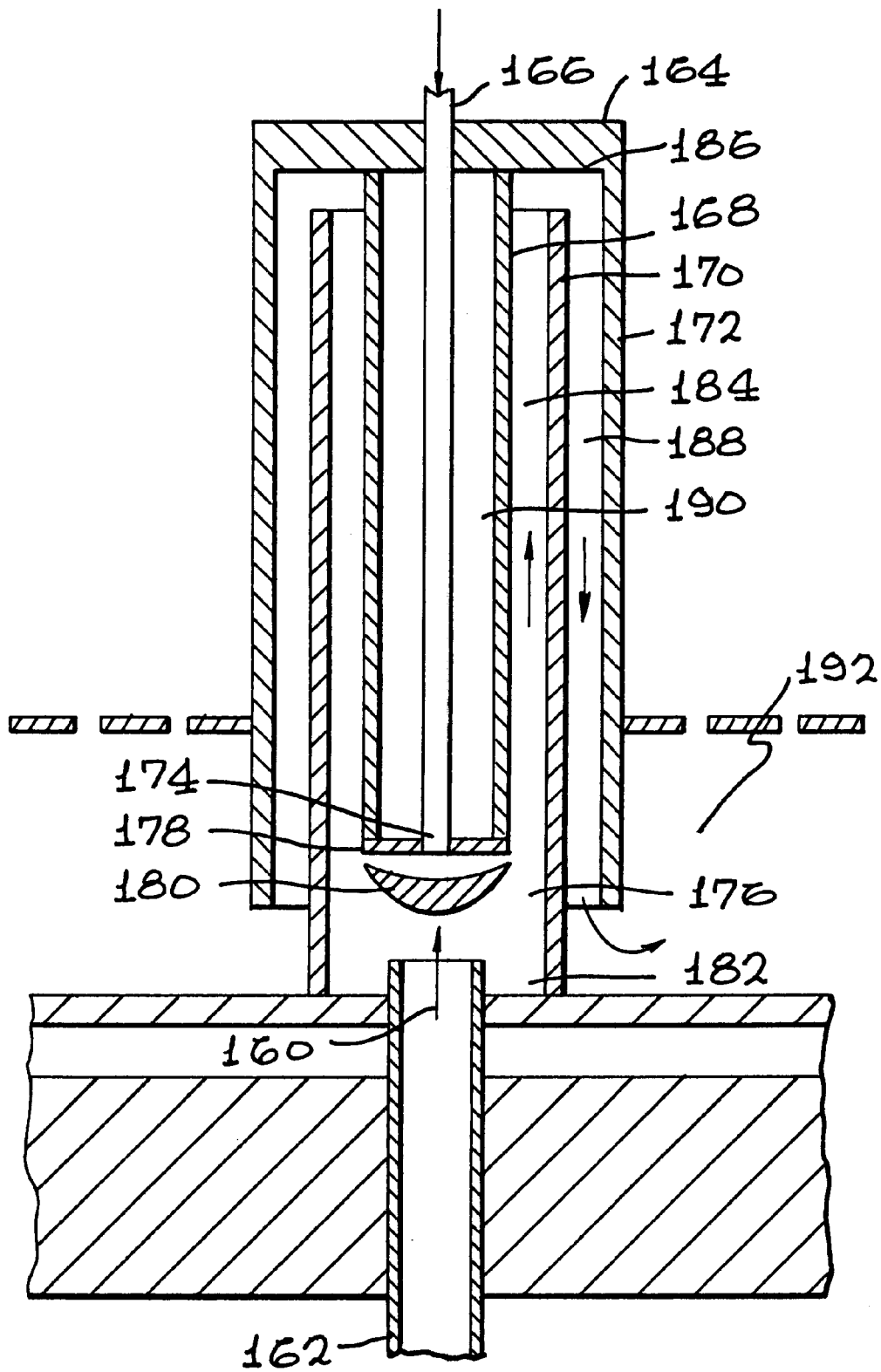

REDUCED CARBON FROM UNDER OXIDIZED BURNER

CROSS REFERENCE TO RELATED APPLICATIONS

This application claims the benefit of U.S. provisional application Ser. No. 60/089,942 filed Jun. 19, 1998.

FIELD OF THE INVENTION

This invention relates to an apparatus and method for reducing or preventing the formation of carbon in under-oxidized burners. Particularly, the invention attempts to eliminate or reduce such formation of carbon by regulating the temperatures and/or partial pressure ratios of carbon monoxide (CO) and carbon dioxide ($CO_2$) within the burner during both steady state and transient operation. This invention includes hardware specifically directed at the regenerative heat exchanger section of the under-oxidized burner and the water-quench section.

BACKGROUND OF THE INVENTION

Under-oxidized burners are used for $H_2$ and/or $H_2$+CO mixed gas stream generators, which can in turn be used in a variety of applications including, but not limited to, on-site $H_2$ equipment, fuel cell power systems, and low emissions combustion equipment. These generators have been described in the patent literature and are typically fed any hydrocarbon fuels.

The present applicant has described in a number of patents various technologies for under-oxidized burners (UOB™) where fuel and air are introduced to and mixed thoroughly in an internal combustion chamber. By providing a mixing device including baffle and wall arrangements against which the fuel and air are caused to impinge, substantially complete air and fuel mixing may be facilitated prior to and during the combustion. In combination with these mixing innovations, preheating of the incoming feed gases is taught to take advantage of the energy in the high temperature exhaust product gases, and thereby raise the non-catalyzed reaction temperature sufficiently that equilibration is approached without carbon as an undesirable side product.

The applicant has, in prior patents obtained, described a number of embodiments of both burner chambers, injector arrangements, and preheating configurations that achieve thorough mixing, igniting, burning, and exhausting of the fuel and/or fuel/air mixtures. These embodiments are prerequisites to the successful production of maximum hydrogen from the fuels. Applicant's U.S. Pat. Nos. 5,207,185, 5,299,536, 5,441,546, 5,437,123, 5,529,484, and 5,546,701 all describe different systems for under-oxidized burners, injectors, preheat heat-exchanger configurations, and other advances in the technology. All of the aforementioned patents are hereby incorporated into this application by reference.

A typical UOB™ apparatus disclosed in the prior art has a hydrogen generator including a housing and combustion chamber. Lines for introduction of fuel and air respectively are provided to an injector, which introduces the air and fuel into the chamber. The air and fuel is mixed in a tube or within the chamber and is directed to a baffle against which the fuel and air impinge, reversing the flow of the air/fuel mixture to further enhance mixing. In addition, this prior art also teaches the use of the reaction chamber walls for reversing the flow of the air/fuel mixtures and changing the flow paths to enhance mixing both prior to and during the combustion process. It also teaches means to achieve mixing by aerodynamic effects between adjacent streams of fuel and air. The mixture is then ignited, often initially by a spark plug.

In variations, fuel and air may be introduced through combined or separate lines and passed through a tube or coil or shell-in-shell heat exchanger configuration within the chamber and/or the primary chamber's exhaust in order to preheat the incoming feed gases. This is done before it reaches the injector and enters the primary combustion chamber, and provides recuperative heat exchange needed for achieving high combustion temperatures for effective combustion without a catalyst. If liquid fuels are used, the fuel can be vaporized outside the preheat zone or within the preheat zone.

Carbon will form in the combustion chamber if the feed proportions are such that insufficient oxygen is provided to react with all the carbon in the fuel molecule, such as a stoichiometric ratio with air of less than 0.25 with methane ($CH_4$). This may be eliminated or substantially reduced by proper formulation and control of the fuel and air feed rates within the under-oxidized burner. Carbon may also form as an undesirable byproduct if the combustion is inefficient or incomplete. This may essentially be eliminated by the feed mixing and preheating methods discussed above and covered in the prior art. Carbon may also form by the disproportionation of CO into $CO_2$ and carbon, $$2CO \text{ (gas)} = C \text{ (solid)} + CO_2 \text{ (gas)} + \text{heat.} \tag{1}$$

Since CO is one of the major products in the UOB™, careful design of the burner is needed to avoid this unfavorable side reaction. The relative partial pressure of $CO_2$ and CO and the temperature of the gases or surfaces in contact with gases control this gas phase reaction. The $H_2O$ partial pressure is also involved, due to the shift reaction, $$CO \text{ (gas)} + H_2O \text{ (gas)} = CO_2 \text{ (gas)} + H_2 + \text{heat,} \tag{2}$$

which effects the partial pressures of $CO_2$ and CO. Thus, a concise prediction of the formation of C downstream of the main combustor requires knowledge of all three gases. Nevertheless, CO will not disproportionate if the temperatures are high or if sufficient $CO_2$ is present.

Carbon can also form in processes downstream of the burner system, where the product gases are cooled for various purposes. One of these is in producing further $H_2$ through the shift reaction, in which typically the UOB™ product gases are pre-cooled and humidified. Here, at intermediary temperatures, considerations of the types already discussed show that CO disproportionation, to produce carbon, may occur.

SUMMARY OF THE INVENTION

According to one aspect of the invention, there is provided a burner apparatus for reducing carbon production, the apparatus comprising: a burner having a combustion chamber; a heat exchanger located within the combustion chamber, the heat exchanger having at least one inlet end where air and fuel enters, a heat transfer section, and an outlet end from which an air/fuel process mixture discharges into the combustion chamber and is ignited to produce a product mixture, the inlet end and outlet end being located such that general flow direction of the air and fuel within at least a portion of the heat transfer section is substantially parallel with flow direction of the product mixture in the combustion chamber, the heat transfer section being located within the combustion chamber so as to receive thermal input from the product mixture therein to heat the air and fuel to a temperature sufficiently high to substantially reduce the production of solid carbon therein.

The heat exchanger may have a single inlet through which air and fuel enter to form a process mixture or it may have a pair of separate inlets for entry of air and fuel respectively, the air and fuel being combined downstream in the heat exchanger to form the process mixture.

The temperature of the heat exchanger is preferably modulated so that combustion temperatures are sufficiently high to produce near combustion equilibration.

Preferably, the combustion chamber comprises a combustion portion where the process mixture is ignited and burned and a heat exchange portion, the heat exchanger being located in the heat exchange portion. The combustion portion and the heat exchange portion of the combustion chamber may be demarcated by an annular ring within the combustion chamber, the annular ring having an opening therein providing a communication between the heat exchange portion and the combustion portion.

The burner may further comprise: ignition means for at least initially igniting the process mixture; and an exit opening for product gases located in a top wall of the burner.

Preferably, the outlet end includes injector means for receiving the process mixture, the injector means mixing the air and fuel to form a process mixture prior to or immediately after discharge thereof in a flow path into the combustion chamber. The injector means may comprise at least one baffle to deflect the flow path of the process mixture, thereby thoroughly mixing the fuel and air.

In one embodiment, the heat exchanger is a parallel current heat exchanger comprising a pair of intertwined first and second coiled sections, the inlet end of the first coiled section being connected to an air input line and the inlet end of the second coiled section being connected to a fuel input line. In this arrangement, the outlet end of the first coiled section and the outlet end of the second coiled section are attached to an injector in which the fuel and air are thoroughly mixed prior to discharge into the combustion chamber. In another embodiment, the heat exchanger comprises a combined parallel-current and counter-current configuration. In this arrangement, the heat exchanger comprises a first heat exchange portion where the air and fuel have a flow direction substantially parallel with the flow direction of the product mixture, and a second heat exchange portion where the air and fuel have a flow direction substantially counter to the flow direction of the product mixture, the second heat exchange portion receiving the air and fuel from the first heat exchange portion and discharging the air and fuel into the combustion chamber. Conveniently, both the first heat exchange portion and the second heat exchange portion receive thermal input from combusted product mixture.

In yet another embodiment, the combined parallel-current and counter-current heat exchanger may be of a cascading configuration and comprise a first tubular portion and a second tubular portion for conducting the air and fuel, wherein the second tubular portion is counter-current and receives thermal input from the combusted product mixture, and the first tubular portion is parallel-current and receives thermal input from the second tubular portion.

The burner of the invention may further comprise a water quench reactor for receiving the combusted product mixture from the combustion chamber, the water quench reactor adding water to the effluent to cause rapid cooling thereof and subjecting the effluent and water mixture to mixing prior to downstream processing.

Preferably, solid carbon production is reduced by maintaining the heat exchanger and/or combustion chamber surfaces above temperatures at which disproportionation of carbon monoxide occurs. The dimensions of the heat exchanger and combustion chamber are kept to a minimum, thereby resulting in smaller surface areas where cooling may occur.

In one aspect, the heat transfer section is at least partially a coiled section.

At least a portion of the heat exchanger may have applied thereto a thermal barrier coating to increase resistance to heat transfer. Further, the burner may comprise insulating means adjacent the heat exchanger and within the combustion chamber. This insulating means preferably comprises an insulating cylinder about the heat exchanger and an insulating block within the heat exchanger, the insulating block and insulating cylinder defining therebetween an annular space within which the heat exchanger is located.

According to another aspect of the invention, there is provided a method for reducing solid carbon production within a burner apparatus, the method comprising: introducing a process mixture of air and fuel into a combustion chamber of the burner through a heat exchanger, the process mixture moving through the heat exchanger in a general first flow direction; igniting and combusting the process mixture in the combustion chamber to produce a product mixture; coursing the product mixture around the heat exchanger to raise the temperature of the heat exchanger and the process mixture therein, the product mixture moving through the combustion chamber in a second flow direction which is substantially parallel with that of the first flow direction; wherein thermal input from the product mixture raises the temperature of the heat exchanger to a sufficiently high degree so as to substantially reduce the production of solid carbon therein. Combustion temperatures within the burner are conveniently maintained sufficiently high so as to obtain near combustion equilibration.

According to still another aspect of the invention, there is provided apparatus for shear mixing burner effluent from an under-oxidized burner to produce hydrogen, the apparatus comprising: a quench reactor chamber; conduit means for introducing the effluent into the quench reactor chamber; water input means for introducing water into the quench reactor chamber and mixing it with the effluent from the burner, the effluent undergoing rapid cooling; and shear means providing a flow path for the water and effluent mixture to facilitate further mixing of the water and effluent.

Preferably, the apparatus has water input means comprising upper and lower substantially coaxial discs spaced from each other and located adjacent the effluent conduit means, the water input means further comprising an entry port whereby water is introduced to a space between the discs, so that water can be discharged radially outward from the space between the discs, the water emerging from the space being entrained by the effluent discharged from the effluent conduit means. The lower disc may have substantially parallel upper and lower surfaces, a flat upper surface and a convex lower surface, or upper and lower surfaces both of which are convex.

The conduit means is preferably a tubular member and the shear means may comprise a second tube coaxial with and surrounding the tubular member so as to provide an inner annular space, the water and effluent mixture being forced through the inner annular space. The shear means may further comprise a third tube coaxial with and surrounding the second tube and providing an intermediate annular space between the second and third tubes, wherein the water and effluent mixture is discharged into the intermediate annular space from the inner annular space.

In various embodiments, the space between the first and second discs is empty; or the space between the first and second discs is filled with a material. Such material is preferably at least one selected from the group consisting of: a sponge-like porous material, a ceramic insulation material, a metal screen material, a combination of thereof. Each disc may have a diameter which is greater than an internal diameter of the effluent conduit.

In yet a further aspect, the invention is for a method for shear mixing burner effluent received from an under-oxidized burner so as to augment hydrogen production, the method comprising: providing a quench reactor chamber: introducing the effluent by means of a conduit into the quench reactor chamber; introducing water into the quench reactor chamber and mixing it with the effluent from the burner; and providing a flow path for the water and effluent mixture wherein further shear mixing of the water and effluent can take place.

In this method, water may be mixed with the effluent by providing first and second discs through which the water is discharged radially outward from a space between the discs, the water emerging from the space being entrained by the effluent discharged from the effluent conduit means. The flow path may comprise a series of annular spaces defined by coaxial tubes, the water and effluent mixture being channeled through successive annular spaces where it undergoes a shear force mixing.

In a modification of the above method and apparatus for reducing solid carbon production, increased temperature of the heat exchanger surfaces is induced by decreasing the area through which the exterior hot air passes by the addition of insulating inserts or the like or repositioning the heat exchanger to increase the linear velocity of the gases and therefore increases convection heat transfer; and/or increased surface temperature by radiation reflection from the inserts or relocating the heat exchangers surfaces where they can "see" the insulated burner bottom, top and/or sides, which increases radiation heat transfer.

In a modified aspect of the burner, water is added to the feed modifies the combustion species to reduce formation of C.

The present invention is therefore to provide modified recuperative heat exchanger configurations that achieve the desired levels of preheat while controlling temperatures, or adding water to the feed, to thereby minimize or eliminate the formation of carbon through the CO disproportionation reaction. The invention provides apparatus for the water quench of the UOB™ effluent that provides rapid temperature quenching and humidification while minimizing the CO disproportionation reaction. The invention further provides a method of controlling the under-oxidized burner process during start-up and shutdown transitions that minimize the CO disproportionation reaction.

BRIEF DESCRIPTION OF THE DRAWINGS

FIG. 2($b$) is a graph illustrating the feed gas, product gas and surface temperatures achieved with the conventional counter-current flow paths that can give rise to the CO disproportionation reaction, for an apparatus as shown in FIG. 2($a$);

FIG. 3($b$) is a graph illustrating the feed gas, product gas and surface temperatures achieved with the co-current flow path, and which prevents the CO disproportionation reaction, for an apparatus as shown in FIG. 3($a$);

FIG. 4($b$) is a graph illustrating the feed gas, product gas and surface temperatures achieved with the combined co-current and counter-current flow path which prevents the CO disproportionation reaction, for an apparatus as shown in FIG. 4($a$);

FIG. 5($b$) is a graph illustrating the feed gas, product gas and surface temperatures achieved with the co-current flow path which prevents the CO disproportionation reaction, for an apparatus as shown in FIG. 5($a$);

FIG. 6($b$) is a graph illustrating the feed gas, product gas and surface temperatures achieved with the cascaded external counter-current, co-current flow path, which prevents the CO disproportionation reaction, for an apparatus shown in FIG. 6($a$);

DETAILED DESCRIPTION OF THE PREFERRED EMBODIMENTS

Solid carbon, or soot, is often a by-product of fuel combustion, and the amount of such carbon is dependent upon reaction conditions. For example, in an under-oxidized burner, solid carbon may be produced at intermediate temperatures, while higher reaction temperatures do not result in carbon formation. Disproportionation of 2CO into $CO_2$ and C is a major consideration for under-oxidized burner design and operation. Equilibration disproportionation does not occur at high temperatures but is likely at intermediate temperatures, although slow reaction kinetics at sufficiently low temperatures are such that little or no carbon may form. The invention provides apparatus and methods for preventing or at least minimizing the formation of carbon by properly modulating the temperatures within the under-oxidized burner, controlling the product gas composition, and rapidly quenching the product gas upon exiting the under-oxidized burner.

Figure 1:
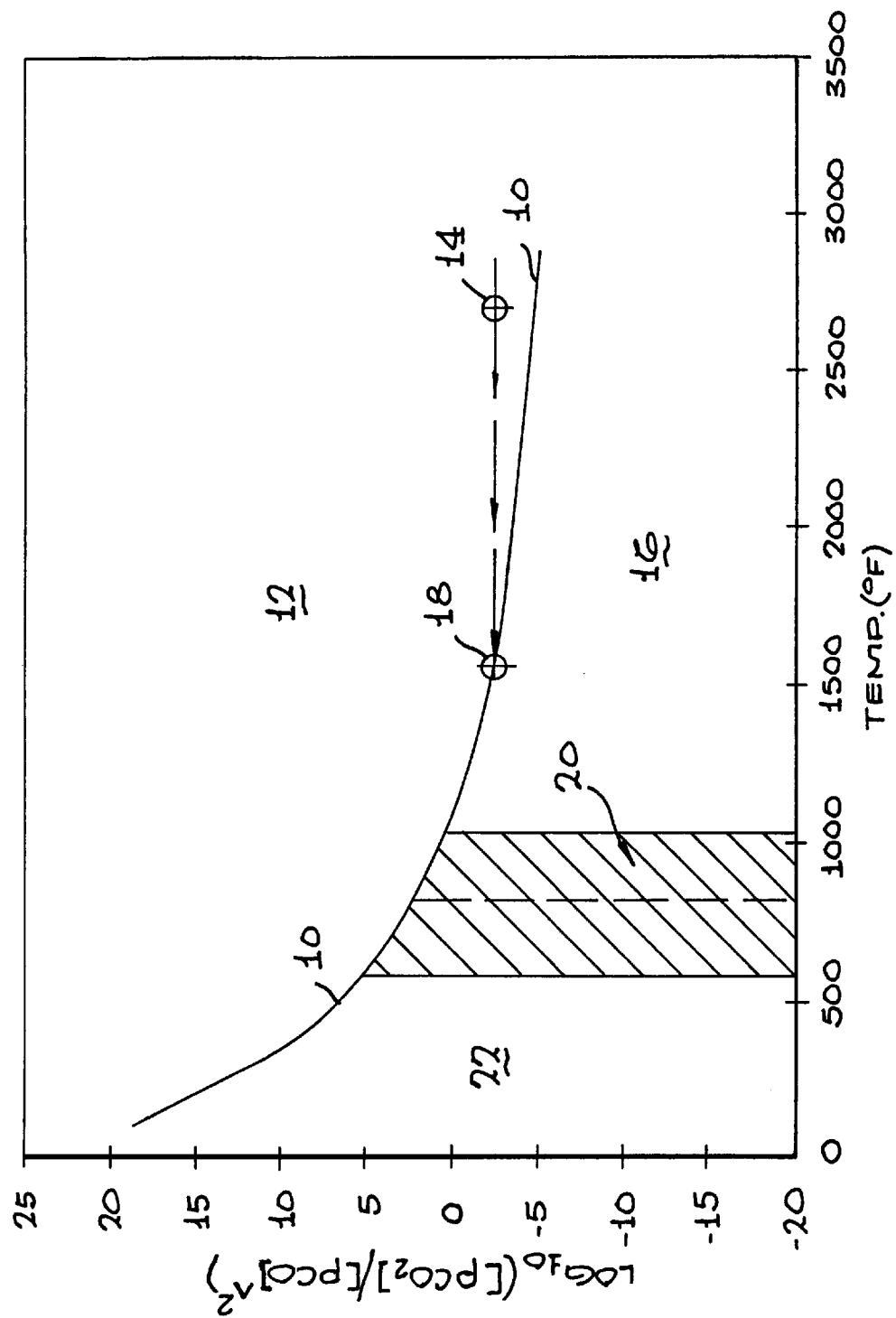
FIG. 1 is a graph showing the CO disproportionation equilibrium as a function of the $CO_2$ and CO partial pressure ratio and temperature.

FIG. 1 is a plot of the equilibrium relation for the CO disproportionation reaction,

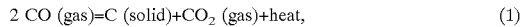
2 CO (gas)=C (solid)+CO$_2$ (gas)+heat,     (1)

in terms of log of the partial pressure ratio, $\text{Log}_{10}[\text{p}(CO_2)/\text{p}(CO)^2]$, of $CO_2$ and CO versus the product gas temperature in degrees F, where p(CO2) and p(CO) are partial pressures of the respective gases. Line 10 in the graph shows the CO disproportionation equilibrium. Region 12 above line 10 indicates where equilibration favors CO stability. If the temperature and partial pressure conditions of the product gases are in region 12, carbon will not form. This includes point 14, which represents a typical gas composition in the reaction chamber of a UOB™. Equilibrium in region 16 below line 10, favors formation of $CO_2$ and C through CO disproportionation. Note that carbon in amounts sufficient to harm a long-term operating burner will form if a portion of the gases contact surfaces at these temperatures. As the product gases cool in the recuperative heat exchanger section, they can eventually reach point 18 (point 18 is also included in subsequent Figures) along the CO disproportionation equilibrium line 10, and if cooled further will enter region 16 where carbon may form. Transition region 20 shows a locus where equilibrium favors formation of carbon, but may be overridden by slow reaction kinetics. Finally, region 22 to the left of transition region 20 indicates conditions at which the kinetics are so slow that little or no carbon forms. Thus, if the conditions of the product gases are those in region 22, reducing the resident time can minimize, or even prevent, the formation of carbon. These low temperatures occur as the burner effluent is cooled.

The present invention minimizes both the number and effects of any cold areas or surfaces in contact with the product gases while the latter are relatively hot. Thus, the innovative recuperative heat exchangers defined herein maintain the surfaces of the heat exchanger above temperatures at which CO disproportionation will occur.

Figure 2A:
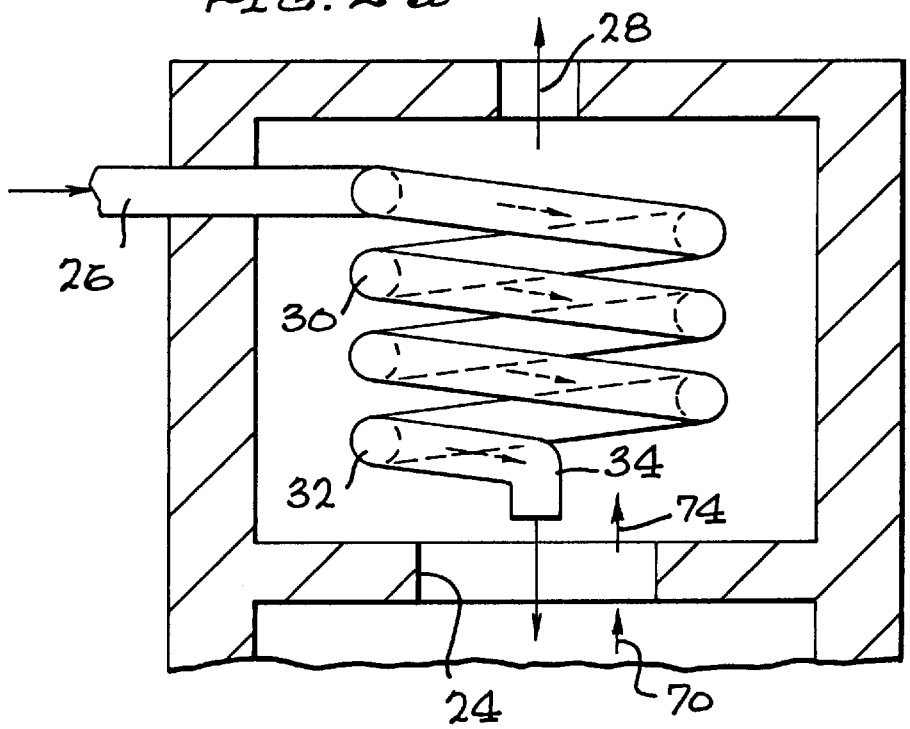
FIG. 2($a$) is a diagrammatic representation of an embodiment of the recuperative heat exchanger section of an under-oxidized burner using conventional counter-current flow paths.
Figure 2B:
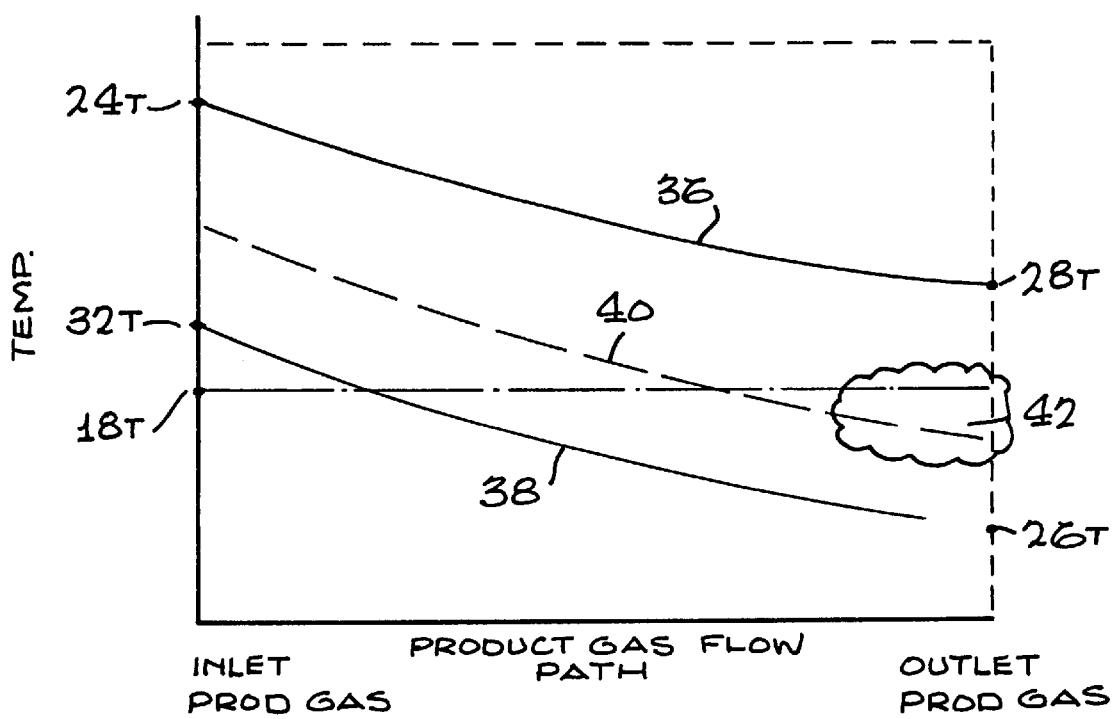

Conventional heat exchanger configurations within the preheat section of under-oxidized burners are represented in FIG. 2(a) and FIG. 2(b), with internal processes explained in particular in the section below related to FIG. 3(a). FIG. 2(a) shows the hot gas from the lower combustor entering inlet 24 at the bottom and leaving at top exit 28, while cold feed gas enters heat exchanger 30 at the top via tube opening or inlet 26 and exits the bottom at injector 34. The heat exchanger has a terminating end 32, whereafter gases the injector 34.

For clarity in these and subsequent Figures, only the air preheat coil is shown, although a mixed air-fuel coil or separate air and fuel coils may be used. The latter may be intertwined or concentric with one coil located inside the other. These have less overall volume and require a smaller heat exchange chamber, which translates to less thermal losses from the burner wall and helps to ensure that the internal insulation does not cool to temperatures where disproportionation of the carbon monoxide is likely.

Returning to FIG. 2(a), the flows inside and outside the exchanger are in the normal counter-current relationship. FIG. 2(b) shows the product gas temperature profile 36 between temperatures 24T and 28T, the feed gas temperature profile 38 between temperatures 32T and 26T, and coil surface temperature profile 40. The coil surface temperature profile 40 is between and more or less parallel to product gas and feed gas temperature profiles 36 and 38. The CO disproportionation temperature profile line is 18T (compare point 18 in FIG. 1). Region 42 of the coil surface temperature profile 40 is at a temperature below line 18T, indicating that the relatively cool surface will tend to coat with carbon.

Figure 3A:
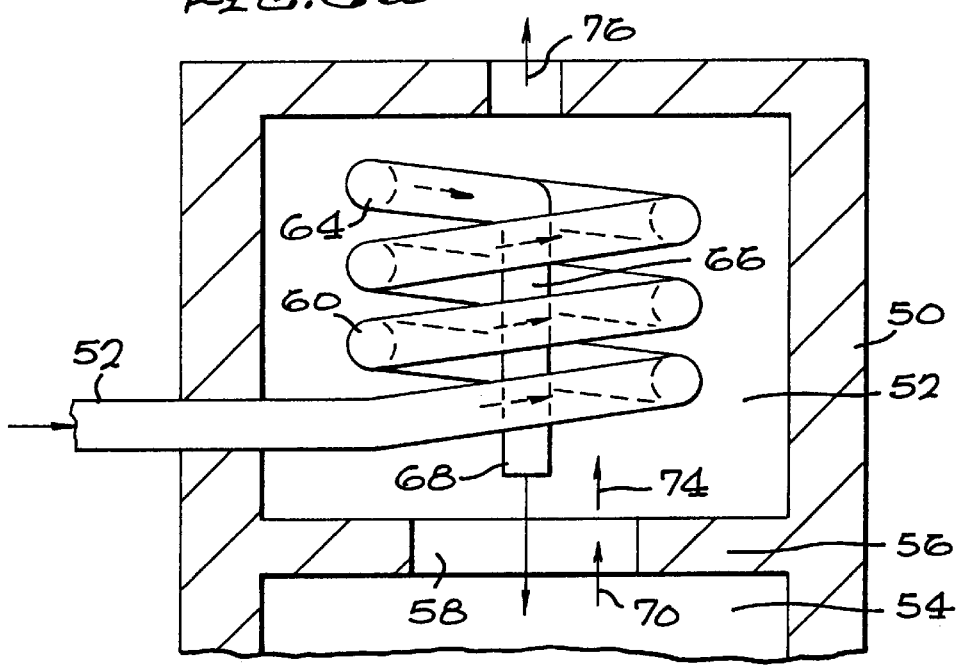
FIG. 3($a$) is a diagrammatic representation of one embodiment of the invention showing a recuperative heat exchanger section of an under-oxidized burner using co-current flow paths.

The inventive co-current flow embodiment of the recuperative heat exchanger 50 is represented diagrammatically in FIG. 3(a). Again, only the air preheat coil is shown. In this figure, a product gas space 52 is separated from a lower reactor space 54 by a combustion chamber ring 56 having an opening 58. A feed heat exchanger is located in the space 52 and comprises a coil 60 with an outer tubular wall having a feed gas input 62 and terminating at a remote end 64, where it connects to an injector assembly 66 having an exit at outlet 68. Heated feed gases are injected from the outlet 68 through opening 58 into the reactor space 54. Product gases 70 from the reactor space 54 flow up through the opening 58 past the heat exchanger and exit at outlet 72. The feed gases 62 flow up coil 60 to connection at end 64 and then to injector assembly 66. Product gas 70 flow at region 74 contacts the coil 60 to which it supplies thermal energy. The product 70 and feed gases flow in essentially the same direction. The product gas 70 at region 76, after passing the preheat coil 60, exits through outlet 72.

Figure 3B:
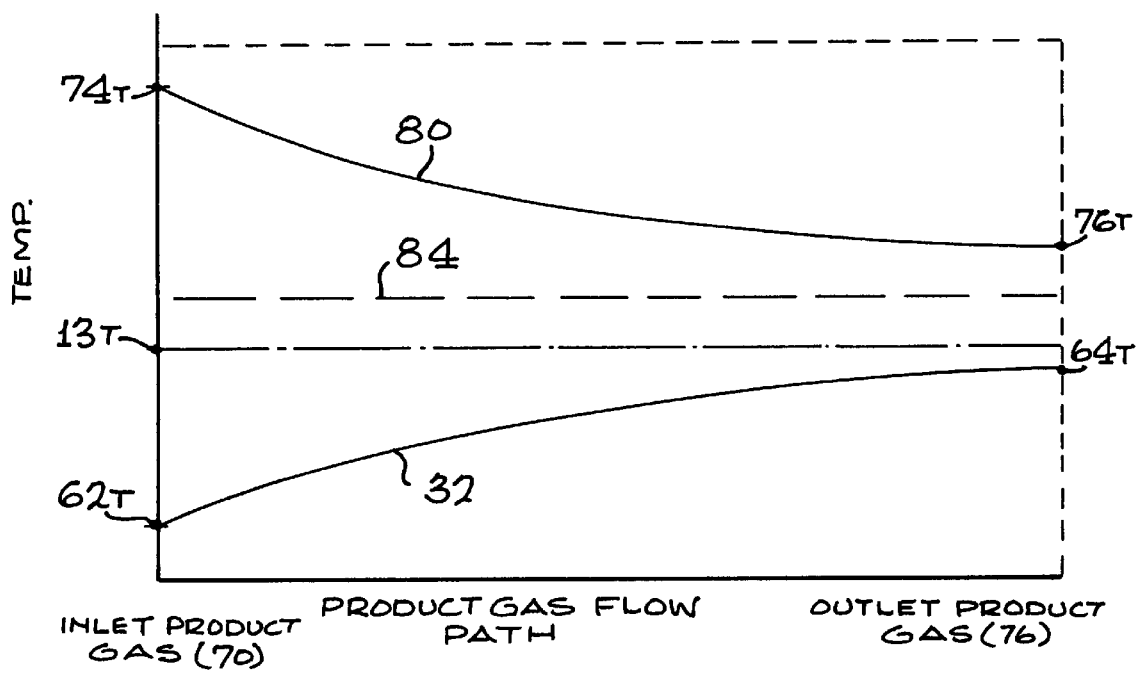

FIG. 3(b) illustrates in graph format the temperatures of feed and product gases of the recuperative heat exchanger 50 shown in FIG. 3(a) as they pass through the heat exchanger 50. As before, reference numerals with the letter "T" represent the temperatures of feed and product gases respectively, and correspond to locations and structures described and illustrated in FIG. 3(a). The curve 80 represents temperatures of the product gas as it decreases from temperature 74T at region 74 to temperature 76T at outlet 72. The curve 82 represents temperature of the feed gas as it increases from temperature 62T at the coil inlet 62 to temperature 64T at the end 64. The curve 84 represents the temperature of the coil surface in contact with the product gas. It resembles a horizontal line with more or less constant temperature between the curves 80 and 82. As in FIG. 2(a), the CO disproportionation temperature profile is shown by line 18T. It is always less then line 84, and, therefore, the surface of the heat exchanger coil 60 is hot enough to prevent the CO disproportionation reaction.

In a modification to this embodiment, the outside surface of heat exchanger coil 60 can be coated with a thermal barrier coating to increase the resistance to heat transfer. This will increase the temperature of surface 60 making the temperature profile represented by curve 84 closer to the product gas temperature profile represented by curve 80.

Figure 4A:
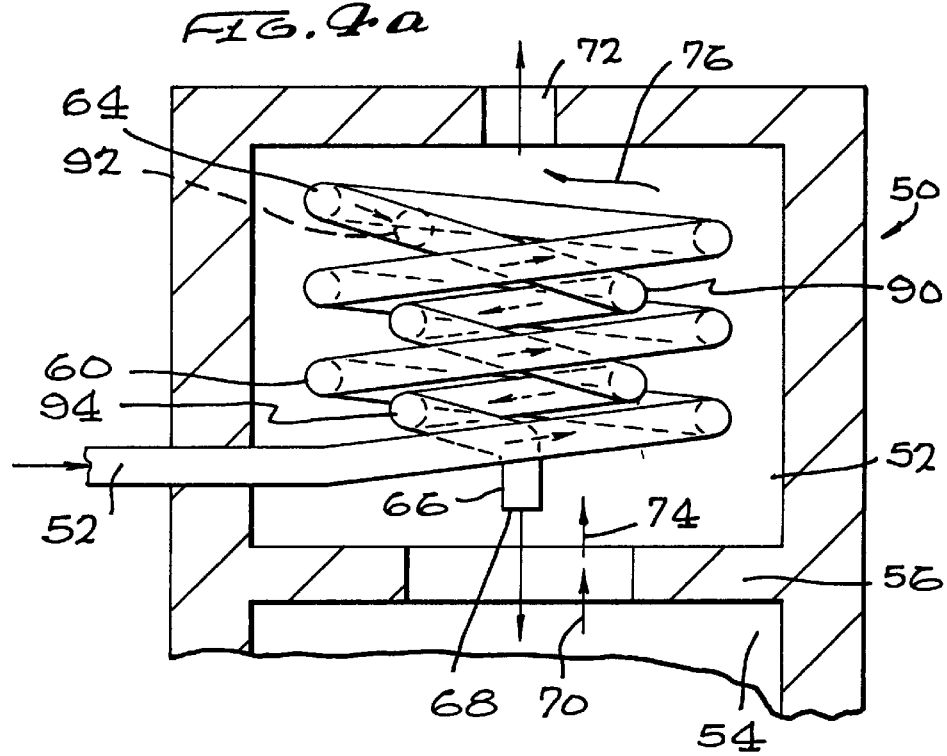
FIG. 4($a$) is a diagrammatic representation of another embodiment of the invention showing a recuperative heat exchanger section of an under-oxidized burner using combined co-current and counter-current flow paths.

FIG. 4(a) is another embodiment of the innovative recuperative co-current, countercurrent heat exchanger that achieves a final preheat temperature greater then obtainable with a single co-current exchanger while avoiding low temperature exchanger walls where CO disproportionation is likely. In the FIG. 4(a), like numbers refer to corresponding parts in FIG. 3(a). Flow in the heat exchanger begins co-current to the exterior gas flow and then becomes of the counter-current type prior to its connection to the injector assembly 66. Thus, it resembles FIG. 3(a) except that, where the co-current outer coil 60 terminates at end 64, it now connects to an inlet 92 of an inner counter-current coil 90, the coil 90 finally ending at outlet 94 where it connects to the injector assembly 66 which in turn lead to the outlet 68.

Figure 4B:
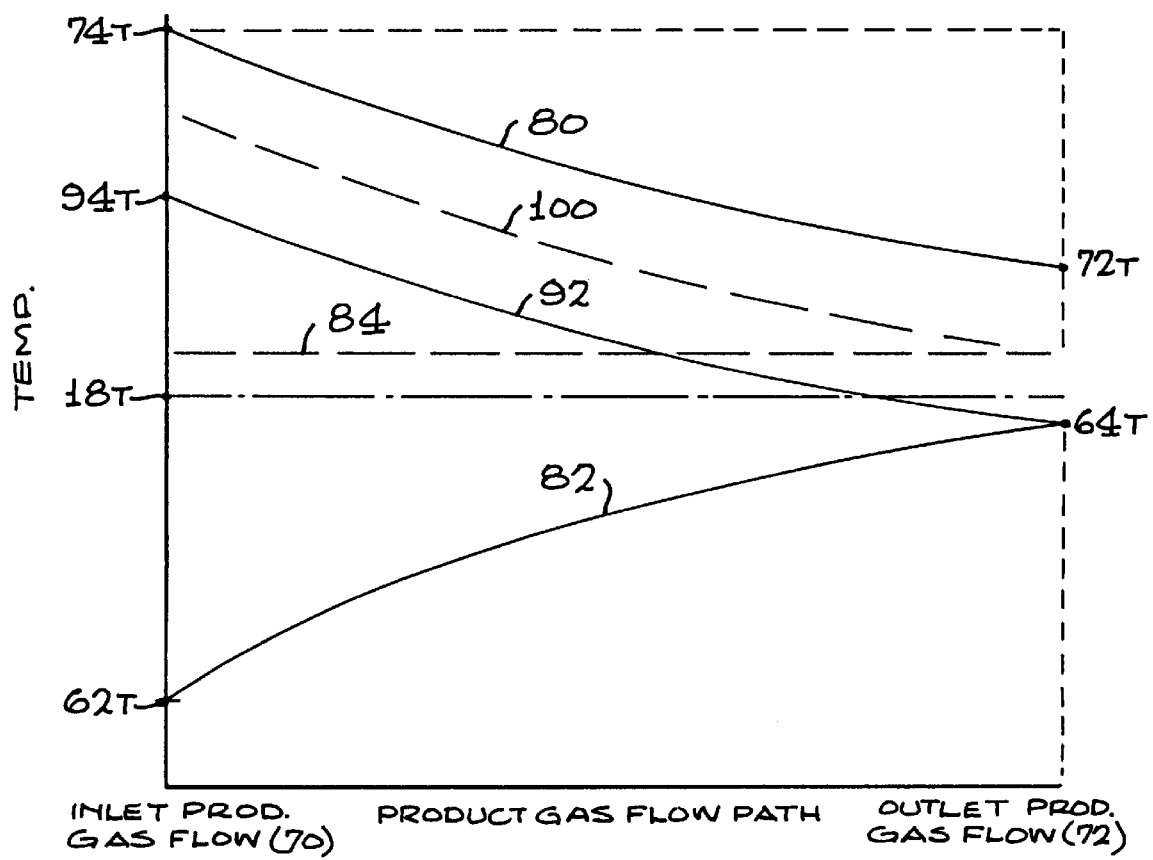

Temperature profiles for the feed and product gases are shown in FIG. 4(b) of the drawings. The product gas temperature curve 80 shows the decrease from temperature 74T, corresponding to its location in the region 74, as it passes through the recuperative heat exchanger section to temperature 76T, corresponding to its location in the region 76 in FIG. 4(a). The feed gas temperature in coil 60 is shown in curve 82, which shows a temperature rise from 62T to 64T, corresponding to movement of the feed gas from the coil inlet 62 to the end 64. The feed gas temperature continues to rise as it moves through the counter-current coil 90 as shown by curve 98, indicating an increase from temperature 64T to 74T as the feed gas passes from the end 64 to the outlet 94 of the counter-current coil 90. The surface temperature of the coil 60 is shown by the curve 84 and the surface temperature of the coil 90 shown by the curve 100. All the surface temperatures of the coils (60 and 90) are higher than the critical CO disproportionation temperature, which is again shown by line 18T in FIG. 4(b). Even so, the feed gas is preheated to temperature 94T, which is higher than in the original co-current case.

The temperature profiles of the heat exchanger walls shown in FIGS. 2(b), 3(b) and 4(b) are more or less horizontal lines. To prevent CO from disproportionating, the curves representing the temperature profiles of the heat exchanger walls must be above the line 18T. If conditions are such that these curves (representing temperature profiles of the heat exchanger walls) locate below the line 18T, they may be properly moved by increased convection and/or radiation heat transfer. Means to do so are illustrated in the FIG. 5, which is a modified version of the embodiment illustrated in FIG. 3(a) of the drawings.

Figure 5A:
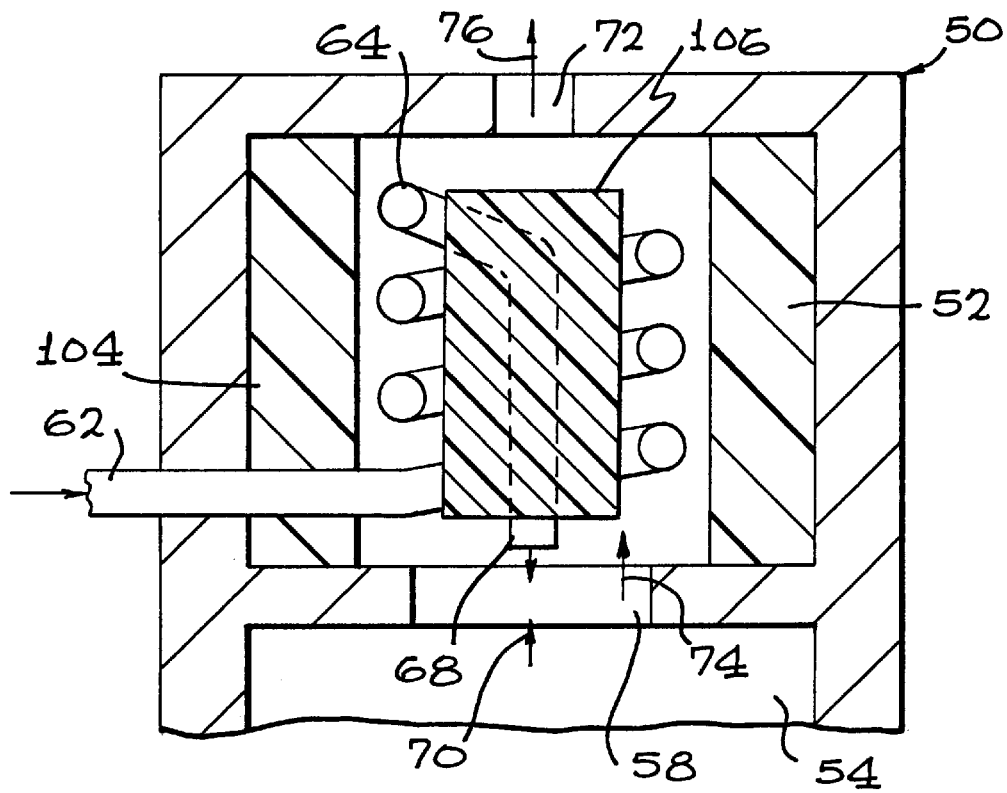
FIG. 5($a$) is a diagrammatic representation of the embodiment of FIG. 3($a$) modified to show a recuperative heat exchanger section of an under-oxidized burner with co-current flow path with an added hollow insulating cylinder between heat exchanger and burner wall and an added insulating cylinder block inserted within the coils of the heat exchanger.
Figure 5B:
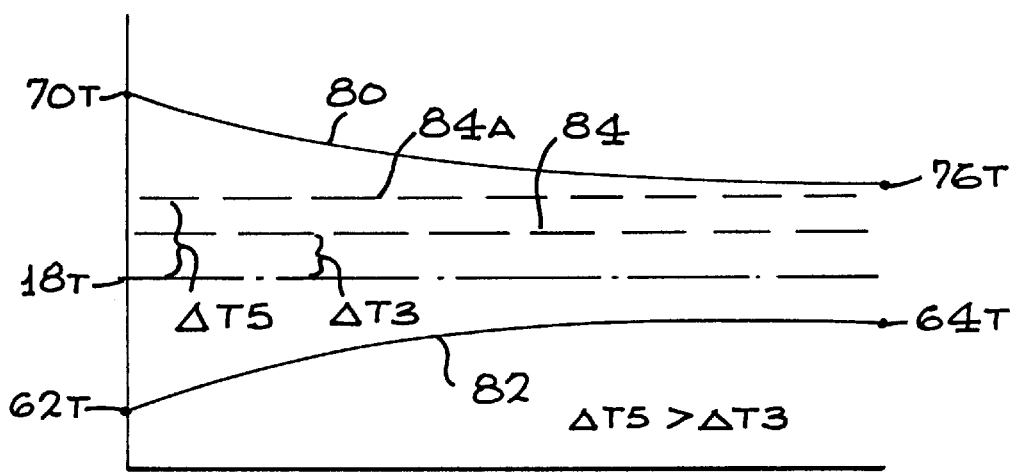

In FIG. 5(a), a hollow cylinder 104, preferably fabricated of insulating material, is inserted between the heat exchanger 50 and coil wall, and an insulation cylinder block 106 is inserted within the coil 60 of the heat exchanger 50. The hollow cylinder 104 and cylinder block 106 are positioned so as to provide open passages on either side of the coil 60, which are of less area than the original passages. As a result, the linear velocity of the transiting product gases increases. This causes an increase in conventional heat transfer approximately proportional to the 0.8 power of the linear flow, which raises the surface temperature of the heat exchanger. The insulating surfaces provided by the hollow cylinder 104 and the cylinder block 106 also increase radiation heat transfer, because passage of the hot product gases rapidly heats their surfaces to temperatures close to that of the gases.

The augmented radiation heat transfer from the insulation to the heat exchangers is proportional to absolute temperature to the 4th power, which also raises the tube surface temperature. Under normal circumstances, heat transfer to the coils for the FIG. 3(a) type of construction is about evenly provided by convection and by radiation from bottom and top. The effect of the hollow cylinder 104 and cylinder block 106 is to increase the surface temperature indicated by line 84 shown in FIG. 3(b) and FIG. 5(b) to temperature shown by line 84A shown in FIG. 5(b). As a result, the temperature margin $\Delta T3$ between the temperature 84 and temperature 18T is increased to temperature margin $\Delta T5$ between temperature 84A and temperature 18T.

Figure 6A:
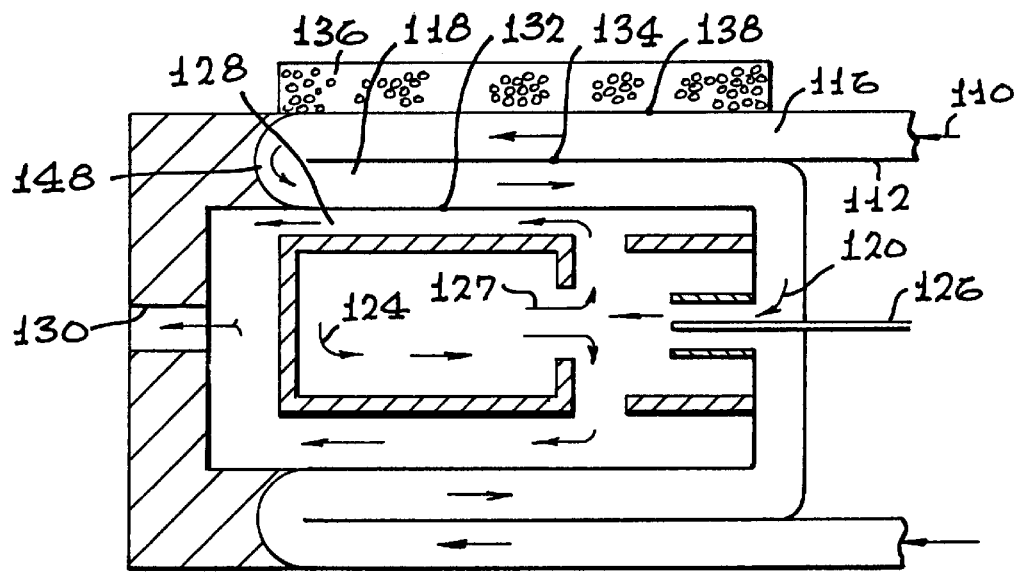
FIG. 6($a$) is a diagrammatic representation of another embodiment of the invention showing an external recuperative heat exchanger section of an under-oxidized burner using a cascaded counter-current flow path.

FIG. 6(a) illustrates heat exchange means, resembling those of U.S. Pat. No. 5,529,484, using annuli around the burner to preheat the feed gases without causing CO disproportionation. Here, the feed gas is preheated by passage thereof through a pair of (first and second) countercurrent external annuli with the second annulus in contact with a first annulus containing product gases whose flow is co-current to the inner feed flow.

With reference to FIG. 6(a), air feed 110 enters the under-oxidized burner at port 112. The air feed 110 flows through an annulus 116, eventually turns to flow through an annulus 118 and subsequently into a space 120. The feed air 110 then enters the exterior annulus of an injector 122, which leads into a reactor chamber 124. Fuel feed 126 enters the interior annulus of the injector 122 which leads into reactor chamber 124 where the air and fuel are mixed, ignited and combusted to form a product gas 127. The product gas 127 is turned and exits the reactor chamber 124 to flow into an annulus cavity 128, finally exiting through an outlet port 130. The product gas in the cavity 128 transfers heat through a wall 132 into the air feed in annulus 118. A portion of this heat heats wall a 134 which in turn heats the entering feed air in the annulus 116. Normally, an insulating layer would be located outside of outside wall 138. The enhancement shown in FIG. 6(a) is an exothermic reactor 136, which may be the shift reactor 136 often used downstream of an under-oxidized burner. In this configuration, thermal barrier coatings can be added to walls 132 and/or 134 (or portions of these walls) to tailor surface temperatures and heat transfer. Adding the thermal barrier coating to the wall 132 increases critical surface temperature at this wall. Adding the thermal barrier coating to the wall 134 allows heat removal from the HTS catalyst 136 that in turn enhances the heat content of the process. The net effect is higher air preheat temperatures reaching the space 120 with less heat removal from the product gas 128; therefore, the temperature 130T at outlet port 130 will be higher.

Figure 6B:
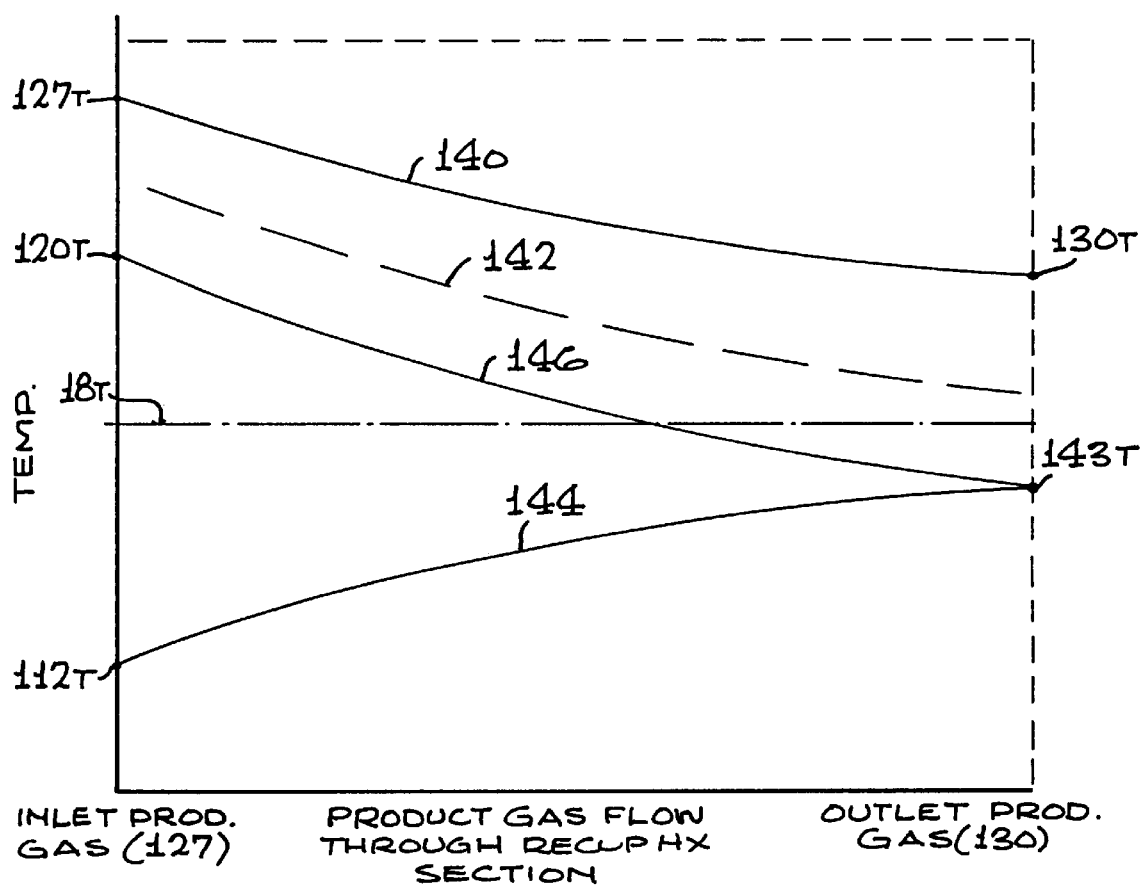

FIG. 6(b) illustrates representative temperature profiles for the embodiment shown in FIG. 6(a). The curve 140 represents the temperature of the product gas in annulus 128 decreasing from 127T to 130T as it moves from region 127 to the outlet port 130, while line 142 represents the temperature of the wall 132. The feed air gas temperature in annulus 116 is represented by line 144, increasing from 112T to 148T as it moves from the port 112 to the region 148, and the feed gas temperature in the cavity 118 is represented by line 146, increasing from 148T to 120T as it moves from the region 148 to the space 120. The product gas temperature 148T and the temperature of the wall indicated by line 142 are maintained above the CO disproportionation critical temperature 18T.

The overall result of this procedure is that the temperature modulation within the under-oxidized burner is achieved in an efficient manner that results in very little solid carbon for the reasons discussed above.

A further means to reduce CO disproportionating is by adding water to the UOB™ feed, because water reduces the CO concentration and increases $CO_2$ through the shift reaction,

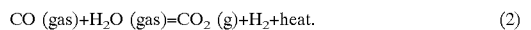
$$CO \text{ (gas)} + H_2O \text{ (gas)} = CO_2 \text{ (g)} + H_2 + \text{heat}. \tag{2}$$

As a result, the extent of the disproportionating reaction,

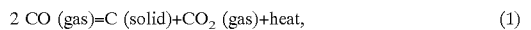
$$2\ CO \text{ (gas)} = C \text{ (solid)} + CO_2 \text{ (gas)} + \text{heat}, \tag{1}$$

is reduced by adding $CO_2$ to the product mix and removing CO from the reactant. The overall effect is to lower point 18T on the respective figures.

Water may be added to the burner feed either as liquid or vapor. If added as liquid, its high heat of vaporization reduces the relatively low heat output of the UOB™, which can impact the efficiency of the burner reaction. If supplied as vapor with overheat, the needed thermal energy should derive from salvaged waste heat from the UOB™ system, such as liberated by a downstream shift reactor, or from combustion of unburned fuel, such as from a downstream fuel cell. These processes require careful design so as not to impact the usefulness of the system.

Carbon can also form in downstream components of under-oxidized burner systems. A major example is in the quench-cool process of water addition to the UOB™ effluent prior to the shift reactor. During the process, the gases pass through temperature regimes where the CO disproportionating equilibration is likely, prior to temperatures where slow kinetics take over. FIG. 7 illustrates an innovative approach to effect such mixing so that the temperature of the gas mixture is very rapidly brought to a condition below line 10 of FIG. 1 where kinetic control of the CO disproportionation minimizes carbon formation.

Figure 7A:
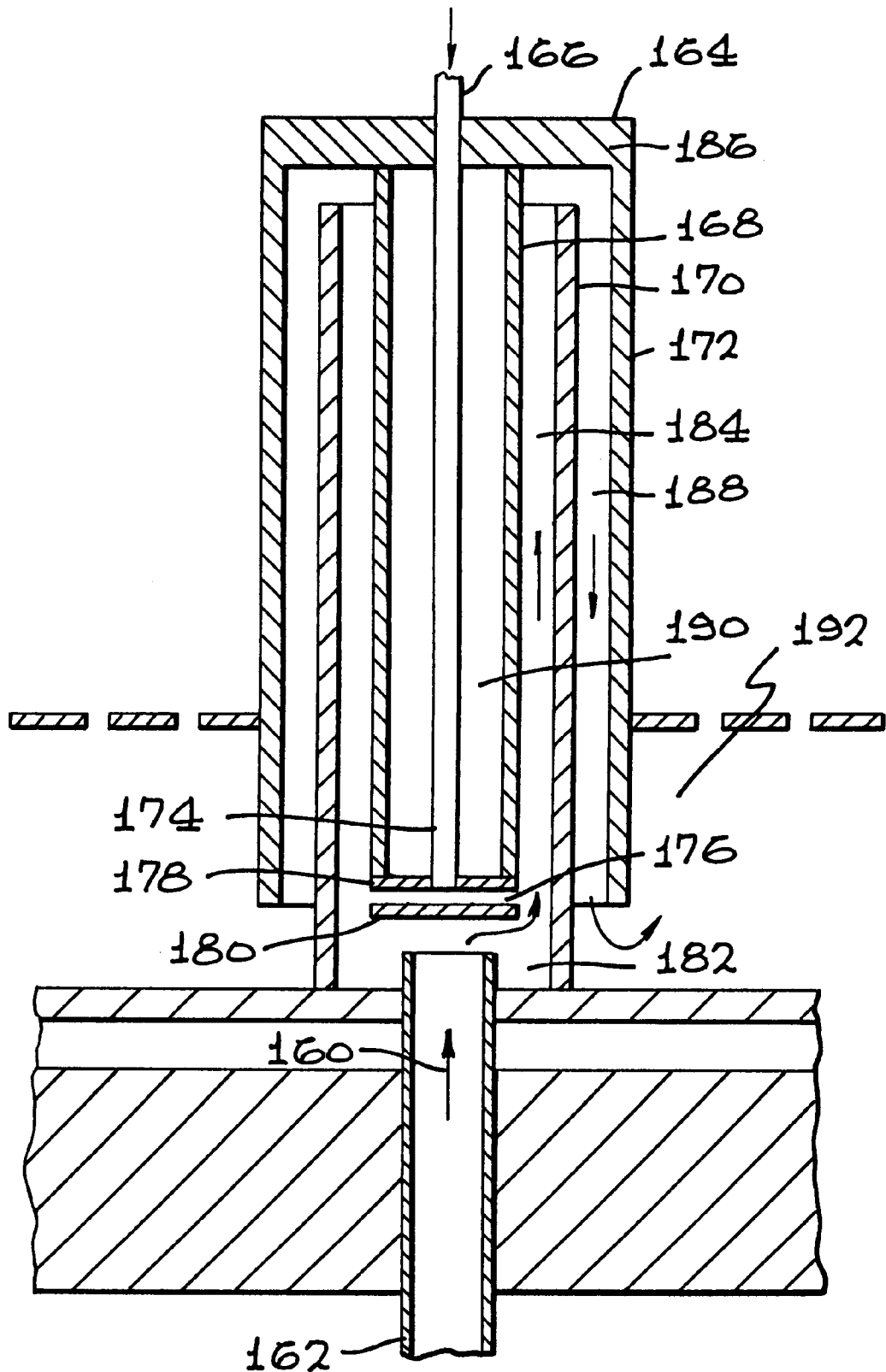
FIGS. 7($a$), ($b$) and ($c$) are diagrammatic representations of an embodiment of an inventive apparatus of the invention for humidifying and cooling the under-oxidized burner product gases in a manner that minimizes the CO disproportionation reaction.

Referring to FIG. 7(a), product gas 160 exiting the recuperative heat exchanger section passes through a tube 162 and enters shear-type water-quench apparatus 164. The quench apparatus 164 includes water feed tube 166, insulating tube 168, a first wall tube 170, and a second wall tube 172. An insulating space 190 separates the water feed tube 166 from the insulating tube 168. Water is fed through the tube 166 to orifice 174 and then into radial space 176. The space 176 is bounded by an upper disc 178 containing the orifice 174 and a lower disc or plate 180. The diameters of the two discs 178 and 180 are substantially equal, close to that of tube 168, and greater then the internal diameter of tube 162. The space 176 may be empty or it may be filled with material such as a sponge-like porous material or ceramic insulation, metal screen or other suitable substances. Water passes radially from the space 176 and meets and mixes with product gas at region 182, which has turned the corner after contacting lower plate 180. The lower disc 180 may be rounded to minimize pressure loss and induce Coanda flow at its edge. Water from the radial space 176, after impact by product gas flow about the edge of plate 180, begins to flow up the annulus 184 between tubes 168 and 170, where extensive shearing action occurs. The water-product gas mixture continues up annulus 184, and impacts surface 186, causing further mixing. It then turns and flows down the cavity 188 between tubes 170 and 172 with further shear mixing. Ultimately, this mixture exits into space 192, which leads to the shift reactor. The water and product gas mixture is thoroughly mixed to create rapid temperature decrease.

Figure 7C:
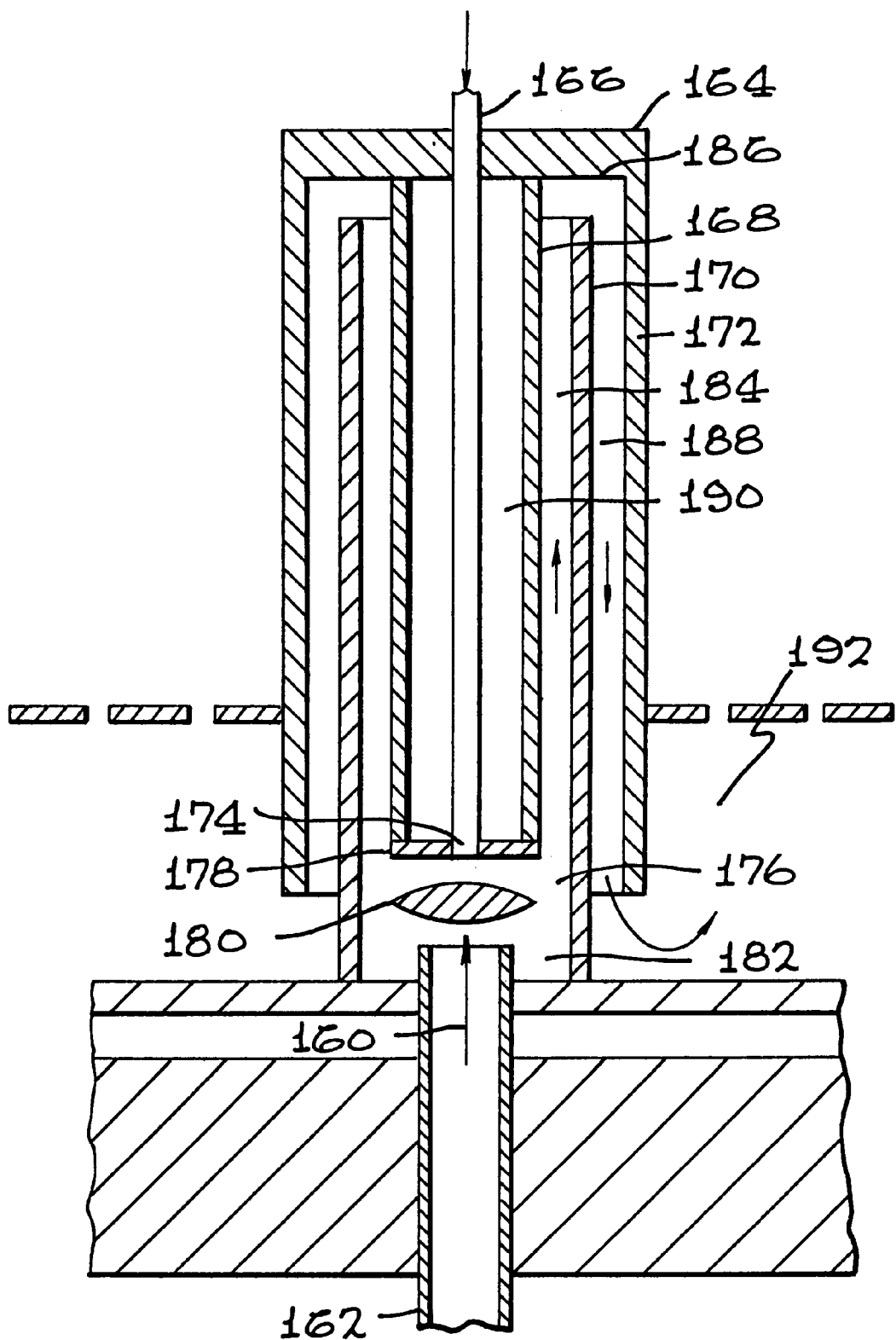

In FIGS. 7(b) and (c), the bottom of the plate or disc 180 has a convex-down bulge. This shape induces Coanda flow of the air that follows the supporting contour through aerodynamic effects. Further, this fast moving more or less homogeneous sheet of air will induct liquid water from the aperture. In FIG. 7(b), the top of the bottom plate is concave up. This shape results in hydrodynamic forces that cause the impacting water jet to form a sheet, open side up (as produced when a spoon is placed under a faucet with flowing water). This sheet is perpetuated as it passes the edge of the surface. In FIG. 7(c), the top of the plate or disc 180 is convex up. This, too, results in a sheet of water which continues beyond the surface edge. On meeting at the edge of the aperture, gas and air sheets will form a homogeneous concentration of the two, which mix and thermally equilibrate on passage through the annuli.

For successful operation, the water in feed tube 166 must not be permitted to boil prior to entering the space 176, non-humidified product gases must be prevented from contacting surfaces at temperatures above transition temperature 20 referred to in FIG. 1, and the dimensions of the tubes 168, 170, and 172 must be such that the appropriate flow velocity of the product gas-steam mixture is achieved. In many practical cases, the drop in pressure should also be minimized. Table 1 below provides information on a shear mixer with an outer diameter (OD) of 1.25 in and length of 1 ft. tube 168, and various inner diameters (ID) for tube 170. Data are for an under-oxidized burner operating with methane and 0.45 stoichiometric air at 150 psig, with water quench to 650° F.

TABLE 1

Shear Mixer
System: Methane, 0.45 Stoic Air, 150 psig Water Quench to 650° F.
Outside Diam Inner Tube = 1.25 in, Tube Length = 1 ft.

| Diameter Outer Tube Inches | Annulus Thickness Inches | Velocity ft/sec | Time in milisec/ft | Annulus Pressure Drop psi/ft |
|---|---|---|---|---|
| 1.61 | 0.180 | 45.7 | 22 | .033 |
| 1.52 | 0.123 | 86.8 | 12 | .18 |
| 1.48 | 0.115 | 125 | 8 | .46 |
| 1.47 | 0.110 | 141 | 7 | .79 |
| 1.45 | 0.100 | 162 | 6 | 1.36 |
| 1.44 | 0.095 | 195 | 5 | 1.53 |
| 1.39 | 0.070 | 347 | 3 | 7.38 |
| 1.37 | 0.060 | 500 | 2 | 21.52 |

As shown, stay time in the annulus decreases with its thickness and pressure drop increases. With an acceptable annulus thickness of only 0.1 in, the stay time in a 1 ft. long unit is about 0.006 sec and pressure drop is 1.36 psi/ft. This assures rapid shear mixing and minimum carbon formation. By contrast, water spray methods require longer stay times.

Figure 8:
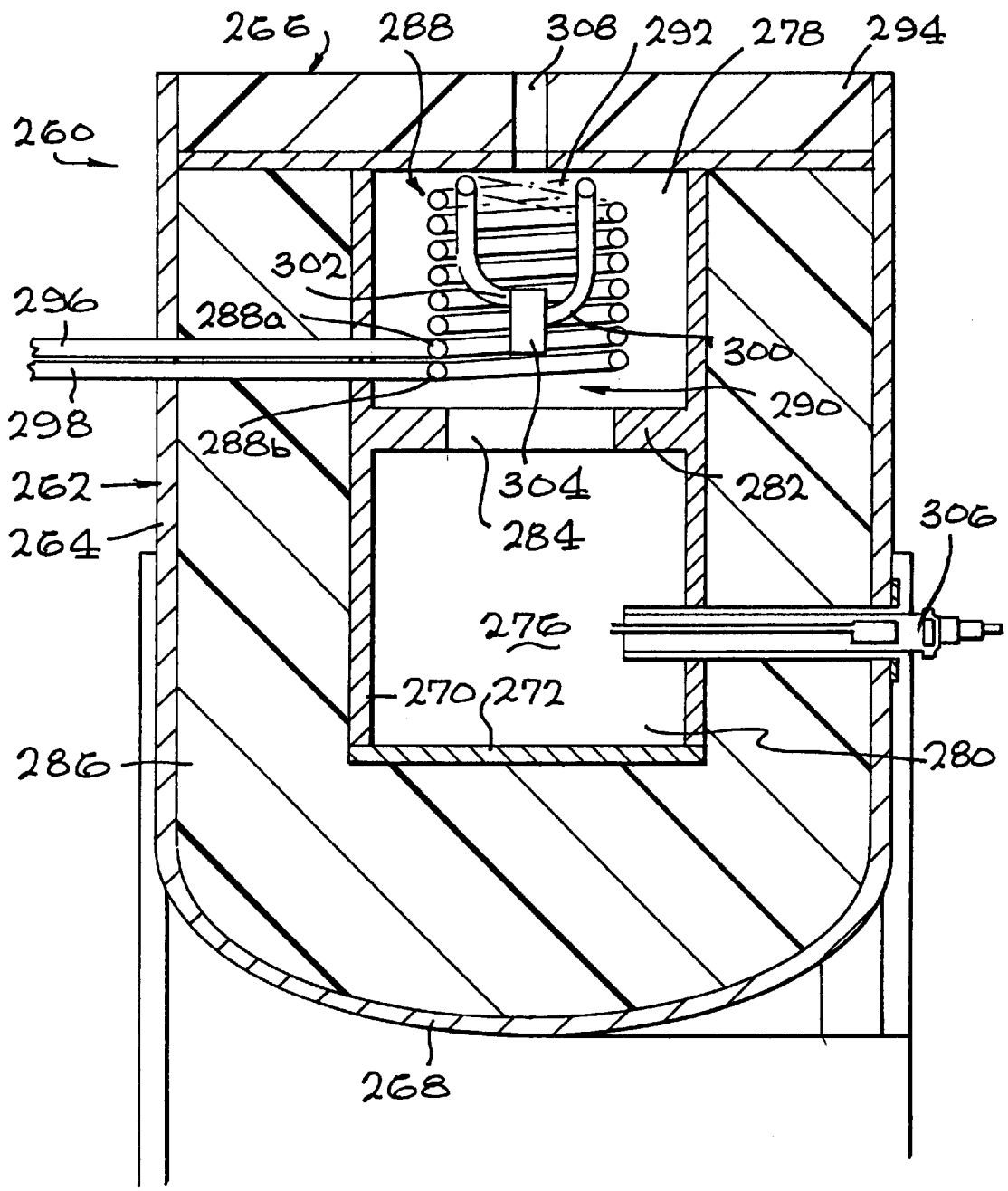
FIG. 8 shows another embodiment of an under-oxidized burner including a parallel-current heat exchanger.

In FIG. 8 of the drawings, one preferred embodiment of the under-oxidized burner 260 is shown with a parallel-current heat exchanger. The burner 260 is generally of cylindrical shape, and is contained within an outer casing 262 having side walls 264, an upper end 266 and a lower end 268. The burner 260 is formed of a cylindrical wall 270 having a base 272 and an top wall 274, all of which define a chamber 276. The upper portion of the chamber 276 constitutes the heat exchange chamber 278 and the lower portion of the chamber 276 constitutes a combustion chamber 280. An annular ring 282 extending inwardly form the cylindrical wall 270 of the burner 260 demarcates the heat exchange chamber 278 and the combustion chamber 280. An aperture 284 is defined by the annular ring 282 permitting communication between the heat exchange chamber 278 and the combustion chamber 280.

Insulation 286 is provided between the cylindrical wall 270 and the outer casing 262 to minimize thermal losses from the chamber 276. Insulation is also provided above and below the burner 260.

A double coil heat exchanger 288 is located in the heat exchange chamber 278. The heat exchanger 288 is positioned near the top of the burner, and the bottom 290 of the heat exchanger 288 is suitably positioned at a height in the burner which best facilitates an efficient combustion. The top 292 of the heat exchanger 288 is very close to the top wall of the burner 260 and also, therefore, very close to the upper insulation 294. As a consequence of this optimal positioning of the heat exchanger 288 within the heat exchange chamber 278 of the burner 260, the heat exchange chamber 278 can be constructed so as to have minimum volume. The minimum volume reduces the potential for colder surfaces, and concomitant temperature drop in the reaction chamber and thereby avoids to a large extent the production of solid carbon.

An air input line 296 and fuel input line 298 are provided, and each line is connected to a suitable air and fuel source respectively. The heat exchanger 288 itself comprises a pair of intertwined coils 288a and 288b respectively. The coil 288a is connected to the air input line 296, while the coil 288b is connected to the fuel input line 298. The coil 288a is connected at its end remote form the air input line 296 to a conduit 300, while the coil 288b is connected at its end remote from the fuel input line 298 to conduit 302. Each of the conduits 300 and 302 leads into an injector 304 which is also located in the heat exchange chamber 278. The preheated fuel and air may be mixed in the injector in a manner described in Applicant's previous patents mentioned above. A significant number of different embodiments of the injector may be provided.

The heated and mixed feed from the injector 304 moves into the combustion chamber 280. A sparkplug 306 ignites the mixture and the combusted mixture in the combustion chamber 280 is recirculated and passes into the heat exchange chamber 278, thus providing the thermal input for preheating the heat exchanger 288 and the air and fuel moving therethrough. An exit aperture 308 is provided in the top wall 274 of the burner 260, in the upper insulation 294 and the upper end 266 of the outer casing 262. The combusted effluent of the chamber 276 exits through the aperture 308 and may be further treated, as appropriate.

In operation, air and fuel at proper ratios and flow rates pass into the air and fuel input lines 296 and 298 respectively and are heated while passing through the coils 288a and 288b of the heat exchanger 288. The hot gases pass into the injector 304 and are thereafter directed into the combustion chamber 280. Here they are ignited by the sparkplug 306, and the combusted gases proceed around the heat exchanger 278 and eventually leave via the exit 308. The overall result of this procedure is that the temperature modulation within the under-oxidized burner is achieved in an efficient manner that results in very little solid carbon for the reasons discussed above.

The two coils 288a and 288b of the heat exchanger 288 are generally of the same overall diameters and are intertwined with each other. However, different forms of heat exchanger 288 may be used. For example, concentric exchangers with one coil located inside the other may also be used. These concentric exchangers have less overall volume, and therefore require a smaller heat exchange chamber. A smaller heat exchange chamber translates to less in the way of thermal losses as a result of fewer cooler surfaces, and helps to ensure that the internal insulation does not cool to temperatures where disproportionation of the carbon monoxide is likely. In another embodiment, a portion of the heat exchanger 288, generally near the top, might be made counter-current, which in certain applications may be more efficient than the parallel-current illustrated in FIG. 8. Such a counter-current configuration may be used as long as the exchanger design continues to provide surface temperatures which are sufficiently high to prevent unnecessary cooling and the resulting disproportionation of the carbon monoxide.

What is claimed is:

1. A burner apparatus for reducing carbon production, the apparatus comprising:
    a burner having a combustion chamber; and
    a heat exchanger located within the combustion chamber, the heat exchanger having at least one inlet end where air and fuel enters, the air and fuel having separate inlets respectively, a heat transfer section, and an outlet end from which an air/fuel process mixture discharges into the combustion chamber and is ignited to produce a product mixture, the inlet end and outlet end being located such that general flow direction of the air and fuel within at least a portion of the heat transfer section is substantially parallel with flow direction of the product mixture in the combustion chamber, the heat transfer section being located within the combustion chamber so as to receive thermal input from the product mixture therein to heat the air and fuel to a temperature sufficiently high to substantially reduce the production of solid carbon therein.

2. A burner as claimed in claim 1 wherein the air and fuel are combined downstream in the heat exchanger to form a process mixture.

3. A burner as claimed in claim 1 wherein the temperature of the heat exchanger is modulated so that combustion temperatures are sufficiently high to produce near combustion equilibration.

4. The burner as claimed in claim 1 wherein the combustion chamber comprises a combustion portion where the process mixture is ignited and burned and a heat exchange portion, the heat exchanger being located in the heat exchange portion.

5. The burner as claimed in claim 4 wherein the combustion portion and the heat exchange portion of the combustion chamber are demarcated by an annular ring within the combustion chamber, the annular ring having an opening therein providing a communication between the heat exchange portion and the combustion portion.

6. A burner as claimed in claim 1 further comprising ignition means for at least initially igniting the process mixture.

7. A burner as claimed in claim 1 having an exit opening for product gases located in a top wall of the burner.

8. A burner as claimed in claim 1 wherein the outlet end includes injector means for receiving the process mixture, the injector means mixing the air and fuel to form a process mixture prior to or immediately after discharge thereof in a flow path into the combustion chamber.

9. A burner as claimed in claim 8 wherein the injector means comprises at least one baffle to deflect the flow path of the process mixture, thereby thoroughly mixing the fuel and air.

10. A burner as claimed in claim 1 wherein the heat exchanger is a parallel current heat exchanger comprising a pair of intertwined first and second coiled sections, the inlet end of the first coiled section being connected to an air input line and the inlet end of the second coiled section being connected to a fuel input line.

11. A burner as claimed in claim 10 wherein the outlet end of the first coiled section and the outlet end of the second coiled section are attached to an injector in which the fuel and air are thoroughly mixed prior to discharge into the combustion chamber.

12. A burner as claimed in claim 1 wherein the heat exchanger comprises a combined parallel-current and counter-current configuration.

13. A burner as claimed in claim 12 wherein the heat exchanger comprises a first heat exchange portion where the air and fuel have a flow direction substantially parallel with the flow direction of the product mixture, and a second heat exchange portion where the air and fuel have a flow direction substantially counter to the flow direction of the product mixture, the second heat exchange portion receiving the air and fuel from the first heat exchange portion and discharging the air and fuel into the combustion chamber.

14. A burner as claimed in claim 13 wherein both the first heat exchange portion and the second heat exchange portion receive thermal input from combusted product mixture.

15. A burner as claimed in claim 12 wherein the combined parallel-current and counter-current heat exchanger is of a cascading configuration and comprises a first tubular portion and a second tubular portion for conducting the air and fuel, wherein the second tubular portion is counter-current and receives thermal input from the combusted product mixture, and the first tubular portion is parallel-current and receives thermal input from the second tubular portion.

16. A burner as claimed in claim 1 further comprising a water quench reactor for receiving the combusted product mixture from the combustion chamber, the water quench reactor adding water to the effluent to cause rapid cooling thereof and subjecting the effluent and water mixture to mixing prior to downstream processing.

17. A burner as claimed in claim 1 wherein solid carbon production is reduced by maintaining the heat exchanger and/or combustion chamber surfaces above temperatures at which disproportionation of carbon monoxide occurs.

18. A burner as claimed in claim 1 wherein dimensions of the heat exchanger and combustion chamber are kept to a minimum, thereby resulting in smaller surface areas where cooling may occur.

19. A burner as claimed in claim 1 wherein the heat transfer section is at least partially a coiled section.

20. A burner as claimed in claim 1 wherein at least a portion of the heat exchanger has applied thereto a thermal barrier coating to increase resistance to heat transfer.

21. A burner as claimed in claim 1 wherein the air and fuel are combined downstream in the heat exchanger to form a process mixture.

22. A burner as claimed in claim 21 wherein the insulating means comprises an insulating cylinder about the heat exchanger and an insulating block within the heat exchanger, the insulating block and insulating cylinder defining therebetween an annular space within which the heat exchanger is located.

23. A method for reducing solid carbon production within a burner apparatus, the method comprising:

introducing a process mixture of air and fuel into a combustion chamber of the burner through a heat exchanger, the air and fuel being separately introduced into the heat exchanger and combined therein to form the process mixture, the process mixture moving through the heat exchanger in a general first-flow direction;

igniting and combusting the process mixture in the combustion chamber to produce a product mixture;

coursing the product mixture around the heat exchanger to raise the temperature of the heat exchanger and the process mixture therein, the product mixture moving through the combustion chamber in a second flow direction which is substantially parallel with that of the first flow direction;

wherein thermal input from the product mixture raises the temperature of the heat exchanger to a substantially higher degree so as to substantially reduce the production of solid carbon therein.

24. A method as claimed in claim 23 wherein combustion temperatures within the burner are maintained sufficiently high so as to obtain near combustion equilibration.

25. Apparatus for shear mixing burner effluent from an under-oxidized burner to produce hydrogen, the apparatus comprising:

a quench reactor chamber;

conduit means for introducing the effluent into the quench reactor chamber;

water input means for introducing water into the quench reactor chamber and mixing it with the effluent from the burner, the effluent undergoing rapid cooling; and shear means providing a flow path for the water and effluent mixture to facilitate further mixing of the water and effluent.

26. Apparatus as claimed in claim 25 wherein the water input means comprises upper and lower substantially coaxial discs spaced from each other and located adjacent the effluent conduit means, the water input means further comprising an entry port whereby water is introduced to a space between the discs, so that water can be discharged radially outward from the space between the discs, the water emerging from the space being entrained by the effluent discharged from the effluent conduit means.

27. A burner as claimed in claim 26 wherein the lower disc has substantially parallel upper and lower surfaces.

28. A burner as claimed in claim 26 wherein the lower disc has a flat upper surface and a convex lower surface.

29. A burner as claimed in claim 26 wherein the lower disc has upper and lower surfaces both of which are convex.

30. Apparatus as claimed in claim 26 wherein the space between the first and second discs is empty.

31. Apparatus as claimed in claim 26 wherein the space between the first and second discs is filled with a material.

32. Apparatus as claimed in claim 31 wherein the material is at least one selected from the group consisting of: a sponge-like porous material, a ceramic insulation material, a metal screen material, a combination of thereof.

33. Apparatus as claimed in claim 26 wherein each disc has a diameter which is greater than an internal diameter of the effluent conduit.

34. Apparatus as claimed in claim 25 wherein the conduit means is a tubular member and the shear means comprises a second tube coaxial with and surrounding the tubular member so as to provide an inner annular space, the water and effluent mixture being forced through the inner annular space.

35. Apparatus as claimed in claim 34 wherein the shear means further comprises a third tube coaxial with and surrounding the second tube and providing an intermediate annular space between the second and third tubes, wherein the water and effluent mixture is discharged into the intermediate annular space from the inner annular space.

36. A method for shear mixing burner effluent received from an under-oxidized burner so as to augment hydrogen production, the method comprising:

providing a quench reactor chamber;

introducing the effluent by means of a conduit into the quench reactor chamber;

introducing water into the quench reactor chamber and mixing it with the effluent from the burner; and providing a flow path for the water and effluent mixture wherein further shear mixing of the water and effluent can take place.

37. A method as claimed in claim 36 wherein water is mixed with the effluent by providing first and second discs through which the water is discharged radially outward from a space between the discs, the water emerging from the space being entrained by the effluent discharged from the effluent conduit means.

38. A method as claimed in claim 36 wherein the flow path comprises a series of annular spaces defined by coaxial tubes, the water and effluent mixture being channeled through successive annular spaces where it undergoes a shear force mixing.

39. A burner apparatus for reducing carbon production, the apparatus comprising:

a burner having a combustion chamber; and a heat exchanger located within the combustion chamber, the heat exchanger having at least one inlet end where air and fuel enters, a heat transfer section, and an outlet end from which an air/fuel process mixture discharges into the combustion chamber and is ignited to produce a product mixture, the inlet end and outlet end being located such that general flow direction of the air and fuel within at least a portion of the heat transfer section is substantially parallel with flow direction of the product mixture in the combustion chamber, the heat transfer section being located within the combustion chamber so as to receive thermal input from the product mixture therein to heat the air and fuel to a temperature sufficiently high to substantially reduce the production of solid carbon therein.

40. A burner as claimed in claim 39 wherein the heat exchanger has a single inlet through which air and fuel enter to form a process mixture.

* * * * *